United States Patent
Nagahara

(10) Patent No.: US 6,883,003 B2
(45) Date of Patent: Apr. 19, 2005

(54) NOTICE INFORMATION PROVIDING SYSTEM, DIGITAL CONTENT DELIVERY SYSTEM, AND STORAGE MEDIUM

(75) Inventor: Atsushi Nagahara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 211 days.

(21) Appl. No.: 09/945,784

(22) Filed: Sep. 5, 2001

(65) Prior Publication Data

US 2002/0035557 A1 Mar. 21, 2002

(30) Foreign Application Priority Data

Sep. 6, 2000 (JP) ........................................ 2000-270434

(51) Int. Cl.[7] .............................................. G06F 17/30
(52) U.S. Cl. ............................ 707/10; 707/3; 707/102; 707/104.1; 709/206; 709/229
(58) Field of Search ........................ 707/1, 10, 104.1, 707/3, 102, 200; 709/206, 218, 203, 229, 207

(56) References Cited

U.S. PATENT DOCUMENTS

| | | | | |
|---|---|---|---|---|
| 5,664,063 A | * | 9/1997 | Johnson et al. | 395/101 |
| 5,960,406 A | * | 9/1999 | Rasansky et al. | 705/9 |
| 6,076,103 A | * | 6/2000 | Sakai | 709/217 |
| 6,151,596 A | * | 11/2000 | Hososhi | 707/1 |
| 6,182,078 B1 | * | 1/2001 | Whitmyer, Jr. | 707/10 |
| 6,292,825 B1 | * | 9/2001 | Chang et al. | 707/206 |
| 6,434,571 B1 | * | 8/2002 | Nolte | 705/9 |
| 6,470,323 B1 | * | 10/2002 | Suzuki et al. | 705/27 |
| 6,480,830 B1 | * | 11/2002 | Ford et al. | 705/9 |
| 6,498,835 B1 | * | 12/2002 | Skladman et al. | 379/88.12 |
| 2002/0116849 A1 | * | 8/2002 | Hayashi | 709/223 |

FOREIGN PATENT DOCUMENTS

| | | |
|---|---|---|
| JP | A-8-13426 | 1/1996 |
| JP | A-11-284655 | 10/1999 |
| JP | A-2000-57492 | 2/2000 |

* cited by examiner

*Primary Examiner*—Charles Rones
*Assistant Examiner*—Jacques Veillard
(74) *Attorney, Agent, or Firm*—Oliff & Berridge, PLC

(57) ABSTRACT

The invention provides a digital content delivery system that prevents information, that is much needed by a user, among public relations information from remaining unnoticed and allows the user to easily gain access to up-to-date public relations information. A content delivery terminal, including a user information registration DB that stores user information, compares the user's age and family structure among the user information in the user information registration DB with those of an intended person of each record in a government office public information registration table. The content delivery terminal also compares the user's age and family structure with those of an intended person of each record in a grade school public information registration table. When there is a match between the user's age and family structure and those of the intended person in each of above two cases, the content delivery terminal acquires the content of, the date and time of, and the frequency of advance notices of the record, and delivers the acquired public information to a user terminal.

15 Claims, 13 Drawing Sheets

500 PUBLIC INFORMATION REGISTRATION TABLE

| CONTENTS | INTENDED PERSONS | DATE AND TIME | FREQUENCY OF ADVANCE NOTICES |
|---|---|---|---|
| INVITATION TO WOMEN'S MEETING | WOMEN | FROM 6 P.M., SECOND FRIDAY, EVERY MONTH | ONE WEEK BEFORE, PRECEDING DAY |
| INVITATION TO CHARITY BAZAAR | ALL | 9:00 A.M.-5:00 P.M., JULY 20 | EVERY DAY FROM ONE WEEK BEFORE. NO FURTHER PRINTING IS PERFORMED IF PRINTING HAS BEEN ALREADY PERFORMED FIVE TIMES |
| INVITATION TO GRADE SCHOOLER BASKETBALL TOURNAMENT IN DISTRICT | GRADE SCHOOLER | FROM 8:30 A.M., JULY 20 | ONE WEEK BEFORE, PRECEDING DAY |

520 GRADE SCHOOL PUBLIC INFORMATION REGISTRATION TABLE

| CONTENTS | INTENDED PERSONS | DATE AND TIME | FREQUENCY OF ADVANCE NOTICES |
|---|---|---|---|
| INVITATION TO THIRTIETH SCHOOLERS' MEETING | GRADE SCHOOLERS | FROM 1:00 P.M., JULY 2 (SUNDAY) | ONE WEEK BEFORE, PRECEDING DAY, CURRENT DAY |
| NOTICE OF COLLECTION OF UNWANTED ARTICLES | ALL | JULY 9 (SUNDAY) | EVERY DAY FROM ONE WEEK BEFORE. NO FURTHER PRINTING IS PERFORMED IF PRINTING HAS BEEN ALREADY PERFORMED FIVE TIMES |
| INVITATION TO CLASSROOM VISITATIONS | PARENTS | FROM 8:30 A.M., JULY 20 (HOLIDAY) | ONE WEEK BEFORE, DAY BEFORE PRECEDING DAY, PRECEDING DAY |

600 USER PROFILE TABLE

| | 602 | 604 | 606 | 608 | 610 | 612 | 614 | 616 | 618 |
|---|---|---|---|---|---|---|---|---|---|
| | | MAIL SERVER NAME | DESTINATION ADDRESS | MAIL PASSWORD | DATE OF DELIVERY | TIME OF DELIVERY | LAYOUT NO. | MAXIMUM NUMBER OF PAGES | FONT SIZE |
| | Andy | TTT | Andy@aaa.com | Abcdef | EVERY DAY | 5 | 2 | 2 | SMALL |
| | Bill | TTT | Bill@bbb.com | Bkjlaf | WEEKDAY | 11 | 5 | 2 | SMALL |
| | Candy | TTT | Candy@ccc.com | Kajdfl | WEEKEND | 9 | 6 | c | STANDARD |

| 620 | 622 | 624 |
|---|---|---|
| ADDRESS | AGE | FAMILY STRUCTURE |
| XXX | 32 | WIFE (30), OLDEST DAUGHTER (8, SECOND GRADE SCHOOLER) |
| YYY | 36 | WIFE (36), OLDEST SON (15, THIRD GRADE, JUNIOR HIGH SCHOOL) |
| ZZZ | 27 | NO FAMILY |

630 LAYOUT DEFINITION TABLE

| LAYOUT NO. | LAYOUT DEFINITION FILE NAME |
|---|---|
| 1 | form01 |
| 2 | form02 |
| 3 | form03 |
| 4 | form04 |
| 5 | form05 |
| 6 | form06 |

```
Step2

INPUT OF DELIVERY INFORMATION

┌─ ACCESS INFORMATION ─┐    ┌─ DATE OF DELIVERY ─────────
│                      │    │  720 ─○ EVERY DAY
│                      │    │  721 ─○ EVERY WEEK
│    MAIL SERVER NAME  │    │  722 ─○ WEEKDAY
│    ┌──────────────┐  │    │         (MONDAY-FRIDAY)
│710─┘              │  │    │  723 ─○ WEEKEND
│    DESTINATION ADDRESS│   │         (SATURDAY AND SUNDAY)
│    ┌──────────────┐  │    └────────────────────────────
│711─┘              │  │    ┌─ TIME OF DELIVERY ─────────
│    MAIL PASSWORD     │    │       ┌─ Select Timezone ▼┐
│    ┌──────────────┐  │    │  730 ─┘                   │
│712─┘              │  │    │       ┌─ Select Time of Day ▼┐
└──────────────────────┘    │  731 ─┘                   │
                            └────────────────────────────
                                          732 ─[ENTER]
```

FIG. 11

Step4

ENTER OF ADDRESS AND OTHERS

ADDRESS
770 — XXX

AGE
771 — 32

FAMILY STRUCTURE

- 772 ☑ SPOUSE  SEX 779 WOMAN  AGE 786 30
- 773 ☐ BROTHER 1  SEX 780  AGE 787  GRADE 793
- 774 ☐ BROTHER 2  SEX 781  AGE 788  GRADE 794
- 775 ☐ BROTHER 3  SEX 782  AGE 789  GRADE 795
- 776 ☑ CHILD 1  SEX 783 WOMAN  AGE 790 8  GRADE 796 SECOND GRADE SCHOOLER
- 777 ☐ CHILD 2  SEX 784  AGE 791  GRADE 797
- 778 ☐ CHILD 3  SEX 785  AGE 792  GRADE 798

799 — [START DELIVERY]

FIG. 13

NOTICE INFORMATION PROVIDING SYSTEM, DIGITAL CONTENT DELIVERY SYSTEM, AND STORAGE MEDIUM

BACKGROUND OF THE INVENTION

1. Field of Invention

The present invention relates to a system for providing public relations information relating to a notice intended for a number of people, such as public information from a government or bulletins in districts, and particularly to a notice information providing system, a digital content delivery system, and a storage medium, in which important public relations information is prevented from remaining unnoticed, while the access to up-to-date public relations information is facilitated.

2. Description of Related Art

Public information from a local government, such as a notice of a date of collection of garbage, a general notice from a local government, public information regarding a general or local election, a notice of interruption of electric service, a notice of interruption of water supply, etc. is typically posted on a bulletin board at a predetermined location. People in a district selectively view the public information on the bulletin board to gain required information. People in each district view a circular notice which may be circulated to them to selectively obtain necessary information regarding a children's meeting, events in each district, etc.

Since public information and a circular notice typically include information apparently needed by a majority of people, the public information and the circular notice sometimes inevitably includes information that is not required by some individuals. The individuals must read the entire circular notice to determine whether any information needed by themselves is included therein. The problem is reduced if the amount of information of the public information or the circular notice is small. When the amount of information is large, reading through the public information or the circular notice is not only laborious, but also presents a risk that required information will escape the attention of the individuals.

To access public information; each individual must personally travel to a predetermined location of a bulletin board. In case of a circular notice, people view it when the circular notice reaches them. There are cases, therefore, that people learn public information or of the circular notice several days after the posting of the public information or the start of the circulation of the circular notice. People have thus difficulty in gaining up-to-date public information.

SUMMARY OF THE INVENTION

The present invention addresses these unresolved problems of the conventional art, and it is an object of the present invention to provide a notice information providing system, a digital content delivery system, and a storage medium, in which important public relations information is prevented from remaining unnoticed, while the access to up-to-date public relations information is facilitated.

To achieve the above object, a notice information providing system of the present invention provides notice information relating to a notice to a user using a notice information storage device which stores the notice information intended for users by associating the notice information with intended person information relating to an intended person for whom a notice is intended. The notice information providing system includes a user information storage device that stores user information relating to the user. The notice information is selected in the notice information storage device, based on the user information in the user information storage device and the intended person information in the notice information storage device, and the selected notice information is provided to the user.

In this arrangement, the notice information is selected in the notice information storage device, based on the user information in the user information storage device and the intended person information in the notice information storage device, and the selected notice information is delivered to the user.

The notice information may be any information that is addressed to the user. For example, the notice information may be information of a notice addressed to particular users, or may be information of a notice addressed to general public including particular users. The former may include information notifying a user of the expiration date of a membership if the user is a member of a rental video shop or a rental CD shop. The latter may include public relations information relating to a notice addressed to general public, such as public information issued from a local government or a circular note in a district. The same is true of a digital content delivery system and a storage medium storing a notice information providing program.

The providing of the notice information refers to making the notice information available for users, which may be performed by delivering the notice information to the user or by storing the notice information in storage device in a terminal with which a user terminal is communicable so that the user gains access from the user terminal. In that sense, the same is true of the storage medium storing a notice information providing program.

The user information storage device may be anything capable of storing the user information regardless of when it does so. The user information storage device may store the user information beforehand, or in response to an input from the outside at the startup of the system without pre-storing the user information. In that sense, the same is true of the notice information storage device. The same is also true of the digital content delivery system and the storage medium storing a notice information providing program.

The notice information storage device may be a storage device available on a network, such as the Internet, and specifically, may be a data base managed by a government office, a public office, or a non-profit organization.

The system may be implemented in a single apparatus, or may be implemented in a network system to which a plurality of terminals are communicably connected. In the latter case, components of each system may be located in any of the plurality of terminals as long as the components are communicably connected to each other. The same is true of the digital content delivery system.

A notice information providing system in accordance with another aspect of the present invention provides notice information relating to a notice to a user, and includes a user information storage device that stores user information relating to the user, a notice information storage device that stores the notice information by associating the notice information with intended person information relating to an intended person for whom a notice is intended, a notice information selection device that selects the notice information in the notice information storage device, based on the user information in the user information storage device and the intended person information in the notice information storage device, and a notice information providing device that for provides the user with the notice information selected by the notice information selection device. The notice information selection device selects the notice information corresponding to the intended person information when the user information in the user information storage device and the intended person information in the notice information storage device satisfy a predetermined condition in the comparison of the user information with the intended person information.

In this arrangement, the notice information selection device selects the notice information corresponding to the intended person information when the user information in the user information storage device and the intended person information in the notice information storage device satisfy a predetermined condition in the comparison of the user information with the intended person information. The notice information providing device provides the user with the selected notice information.

Satisfying the predetermined condition means that a user identified by the user information coincides with a person identified by the intended person information, that a user identified by the user information is included in the persons identified by the intended person information, that results that are obtained by calculating a predetermined equation on the user information agree with the intended person information, or that results that are obtained by calculating a predetermined equation on the user information agree with results that are obtained by calculating a predetermined equation on the intended person information. This also applies to the digital content delivery system.

A notice information providing system in accordance with another aspect of the present invention further includes a notice information output device that outputs the notice information provided by the notice information providing device. The notice information storage device stores the notice information by associating the notice information with notice period information relating to a notice period or notice time limit, and the notice information output device outputs the notice information, provided by the notice information providing device, in accordance with the notice period information corresponding to the notice information.

In this arrangement, the notice information output device outputs the notice information, provided by the notice information providing device, in accordance with the notice period information.

The notice information output device may be a display device, such as a CRT (Cathode Ray Tube), or an LCD (Liquid-Crystal Display), audio output device, such as a loudspeaker, a printer device, such as a printer, a information write device, such as an FDD (Flexible Disk Drive), or communication device, such as a modem, or may be a process for outputting data to one of these devices. These are only examples, and the present invention is not limited to these devices. This also applies to the digital content delivery system.

A notice information providing system in accordance with another aspect of the present invention is arranged in such a way that the notice information output device outputs the notice information at the end of the notice period defined by the notice period information, or when a remaining duration of time to the notice time limit becomes equal to or shorter than a predetermined time.

In this arrangement, the notice information output device outputs the notice information at the end of the notice period defined by the notice period information, or when a remaining duration of time to the notice time limit becomes equal to or shorter than the predetermined time.

The outputting of the notice information may be performed when the remaining duration of time becomes equal to or shorter than the predetermined time. For example, the notice information may be output in the middle of the period specified by the notice period information, and may be output prior to the start of the period specified by the notice period information. The same is true of the digital content delivery system.

A notice information providing system in accordance with another aspect of the present invention is arranged in such a way that the notice information output device outputs the notice information when a user terminal used by the user is powered on.

In this arrangement, the notice information output device outputs the notice information when the user terminal used by the user is powered on.

A notice information providing system in accordance with another aspect of the present invention is arranged in such a way that the user information includes output time designation information designating the time of outputting the notice information, and the notice information output device outputs the notice information at the time designated by the output time designation information from the user information storage device.

In this arrangement, the notice information output device outputs the notice information at the time designated by the output time designation information from the user information storage device.

The output time designation information may designate a particular date and time in a format of month, day, and hour, or may designate, for example, the end of a period of time or the time when a duration of time to the notice time limit becomes equal to or shorter than a predetermined time. The same is true of a digital content delivery system.

A notice information providing system in accordance with another aspect of the present invention is arranged in such a way that the notice information storage device may further store the notice information by associating the notice information with notice period information relating to a notice period or notice time limit, and the notice information selection device selects the notice information based on the notice period information corresponding to the notice information.

In this arrangement, the notice information selection device selects the notice information based on the notice period information corresponding to the notice information.

The notice information selection device may be arranged not to select the notice information whose notice period set by the notice period information has already expired, and to select the notice information whose time period or time limit specified by the notice period information is coming to an end. The same is true of a digital content delivery system.

In a notice information providing system in accordance with another aspect of the present invention the notice information is public relations information relating to a notice intended for a number of people.

In this arrangement, the public relations information relating to a notice addressed to a number of people can be provided to the users as public relations purposes, similarly as described above.

The public relations information includes information of a bulletin from a local government or a circular notice in a district, for example. The same is true of a digital content delivery system.

To achieve the above object, a digital content delivery system of the present invention delivers a digital content by associating the digital content with notice information relating to a notice intended for a user, and includes a user information storage device that stores user information relating to the user, a notice information storage device that stores the notice information by associating the notice information with intended person information relating to an intended person for which a notice is intended, a notice information selection device that selects the notice information in the notice information storage device, based on the user information in the user information storage device and the intended person information in the notice information storage device, a notice information association device that associates the notice information selected by the notice information selection device with the digital content, and content delivery device that delivers, to the user, the digital content associated with the notice information. The notice information selection device selects the notice information corresponding to the intended person information when the user information in the user information storage device and the intended person information in the notice information storage device satisfy a predetermined condition in the comparison of the user information with the intended person information.

In this arrangement, the notice information selection device selects the notice information corresponding to the intended person information when the user information in the user information storage device and the intended person information in the notice information storage device satisfy a predetermined condition in the comparison of the user information with the intended person information. The notice information association means associates the selected notice information with the digital content, and the content delivery means delivers, to the user, the digital content associated with the notice information.

The notice information may be associated with the digital content, for example, by adding the notice information to the digital content, or by adding, to the digital content, reference information (such as a URL (Uniform Resource Locator)) from which the notice information can be retrieved.

The notice information association device may be adapted to add the notice information selected by the notice information selection device directly to the digital content as it is. However, to enhance readability, the notice information selected by the notice information selection device is preferably stressed with font attribute effect.

A digital content delivery system in accordance with another aspect of the present invention, which communicably connects a content delivery terminal that delivers a digital content with a user terminal used by a user to deliver a digital content associating with notice information relating to a notice to a user, includes a notice information storage device that stores the notice information by associating the notice information with intended person information relating to an intended person for whom a notice is intended, or notice period information relating to a notice period or a notice time limit. The content delivery terminal includes a user information storage device that stores user information relating to the user, a notice information selection device that selects the notice information in the notice information storage device, based on the user information in the user information storage device and the intended person information in the notice information storage device, a notice information association device that associates the notice information selected by the notice information selection device and the notice period information corresponding to the notice information with the digital content, and a content delivery device that delivers, to the user terminal, the digital content associated with the notice information. The notice information selection device selects the notice information corresponding to the intended person information when the user information in the user information storage device and the intended person information in the notice information storage device satisfy a predetermined condition in the comparison of the user information with the intended person information, the user terminal includes a notice information output device that outputs notice information associated with the digital content, and the notice information output device outputs the notice information associated with the digital content in accordance with the notice period information associated with the digital content.

In this arrangement, at the content delivery terminal, the notice information selection device selects the notice information corresponding to the intended person information when the user information in the user information storage device and the intended person information in the notice information storage device satisfy a predetermined condition in the comparison of the user information with the intended person information. The notice information association device associates the selected notice information and the notice period information corresponding to the notice information with the digital content. The content delivery device delivers, to the user terminal, the digital content associated with the notice information.

When the digital content is received by the user terminal, the notice information output device outputs the notice information associated with the digital content in accordance with the notice period information.

A digital content delivery system in accordance with another aspect of the present invention is arranged in such a way that the notice information output device outputs the notice information at the end of the notice period defined by the notice period information or when a remaining duration of time to the notice time limit becomes equal to or shorter than a predetermined time.

In this arrangement, the notice information output device outputs the notice information to the user terminal at the end of the notice period defined by the notice period information or when a remaining duration of time to the notice time limit becomes equal to or shorter than a predetermined time.

A digital content delivery system in accordance with another aspect of the present invention is arranged in such a way that the notice information output device outputs the notice information when a user terminal used by the user is powered on.

In this arrangement, the notice information output device outputs the notice information to the user terminal when the user terminal used by the user is powered on.

A digital content delivery system in accordance with another aspect of the present invention is arranged in such a way that the user information includes output time designation information designating the time of outputting the notice information, and the notice information output device outputs the notice information at the time designated by the output time designation information from the user information storage device.

In this arrangement, the notice information output device outputs the notice information to the user terminal at the time designated by the output time designation information from the user information storage device.

A digital content delivery system in accordance with another aspect of the present invention is arranged in such a way that the notice information storage device stores the notice information by associating the notice information with notice period information relating to a notice period or notice time limit, and the notice information selection device selects the notice information based on the notice period information corresponding to the notice information.

In this arrangement, the notice information selection device selects the notice information based on the notice period information corresponding to the notice information.

In a digital content delivery system in accordance with another aspect of the present invention, the notice information is public relations information relating to a notice intended for a number of people.

In this arrangement, public relations information addressed to a number of people is provided to the user for public relations purposes in the same manner as above.

A digital content delivery system in accordance with another aspect of the present invention further includes a content layout device that determines an output layout of the digital content with which the notice information is associated in accordance with the user information in the user information storage device, and for laying out the digital content. The content delivery device delivers, to the user, the digital content that is laid out by the content layout device.

In this arrangement, the content layout device determines an output layout of the digital content with which the notice information is associated in accordance with the user information in the user information storage device, and lays out the digital content. The content delivery device delivers, to the user, the digital content that is laid out by the content layout device.

The output layout includes, for example, a display layout according to which the digital content is displayed on a screen, and a print layout according to which the digital content is printed on a sheet of paper.

A digital content delivery system in accordance with another aspect of the present invention is arranged in such a way that the digital content is electronic mail information stored in an electronic mail server from which the user receives an electronic mail, the user information contains access information required to acquire the electronic mail information from the electronic mail server, and the digital content delivery system is also arranged to include a mail information acquisition device that acquires the electronic mail information from the electronic mail server in accordance with the access information in the user information storage device, and the notice information association device associating the notice information selected by the notice information selection device with the electronic mail information acquired by the mail information acquisition device.

In this arrangement, the mail information acquisition device acquires the electronic mail information from the electronic mail server in accordance with the access information in the user information storage device, and the notice information association device associates the notice information selected by the notice information selection device with the electronic mail information acquired by the mail information acquisition device.

In a digital content delivery system in accordance with another aspect of the present invention, the content delivery terminal is arranged to include a receiver device that receives the notice information, and a setting device that sets the notice information received by the receiver device and a user as a destination.

In this arrangement, when the notice information and the user as a destination are set by the setting device, the content delivery terminal delivers, to the user terminal of the user set by the setting device, the digital content with which the notice information received by the receiver device is associated.

To achieve the above object, on the other hand, a computer readable storage medium of the present invention stores a notice information providing program for providing notice information relating to a notice to a user. The notice information providing program operates in a computer which includes a user information storage device that stores user information relating to the user, and a notice information storage device that stores the notice information by associating the notice information with intended person information relating to an intended person to whom a notice is intended for, and performs a process of selecting the notice information in the notice information storage device, based on the user information in the user information storage device and the intended person information in the notice information storage device, to thereby provide the selected notice information to the user.

In this arrangement, when the computer reads the notice information providing program stored in the storage medium, and executes processes in accordance with the read program, the same effects as those of the notice information providing system discussed above can be obtained.

BRIEF DESCRIPTION OF THE DRAWINGS

FIG. 2 shows a data structure of a government office public information registration table 500;

FIG. 3 shows a data structure of a grade school public information registration table 520;

FIG. 5 shows a data structure of a user profile table 600;

FIG. 11 shows a delivery information entry screen;

FIG. 13 shows a screen for entering addresses and other information;

DETAILED DESCRIPTION OF PREFERRED EMBODIMENTS

Figure 1:
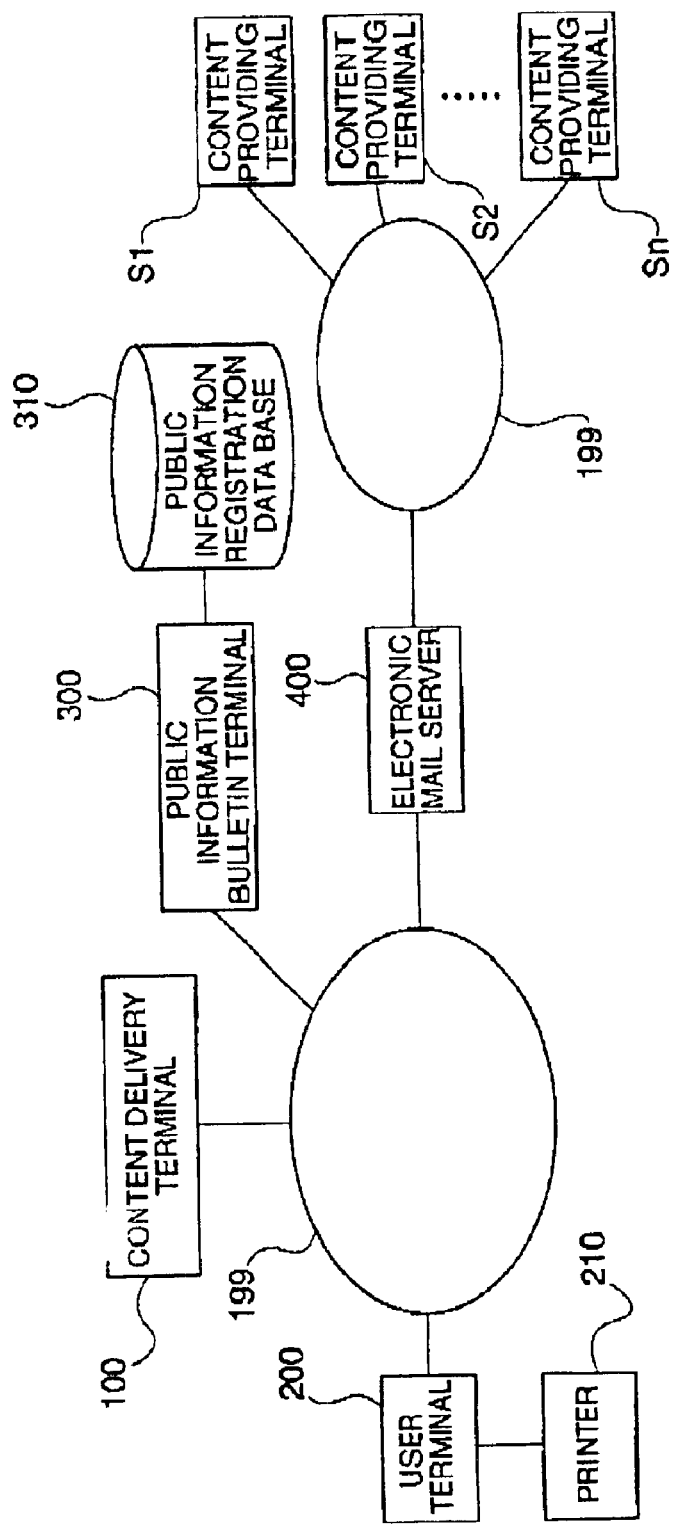
FIG. 1 is a schematic showing the structure of a network system implementing the present invention.

The embodiments of the present invention will now be discussed, referring to the drawings. FIG. 1 through FIG. 14 show exemplary embodiments of a notice information providing system, a digital content delivery system, and a storage medium according to the invention.

As shown in FIG. 1, the notice information providing system, the digital content delivery system, and the storage medium of the present invention are applied to a case in which a content delivery terminal 100 delivers digital contents, such as news, to a user terminal 200.

The structure of a network system implementing the present invention will now be discussed, referring to FIG. 1 which is a schematic showing the structure of the network system implementing the present invention.

Connected to the Internet 199, as shown in FIG. 1, are a plurality of content providing terminals $S_1$–$S_n$ that provides digital contents, an electronic mail server 400 that stores, as electronic mail information, the digital contents supplied by the content providing terminals $S_1$–$S_n$, a public information bulletin terminal 300 that places public information from a government, an invitation from a grade school, etc., a user terminal 200 used by a user, and a content delivery terminal 100 which collects the electronic mail information stored in the electronic mail server 400 and the public information stored in the public information bulletin terminal 300, and delivers these pieces of information to the user terminal 200 as the digital contents. Although a single user terminal 200, a single public information bulletin terminal 300, and a single electronic mail server 400 are shown for simplicity, in practice, a plurality of these components are actually connected to the Internet 199.

Each of the content providing terminals $S_1$–$S_n$, having the same function of a typically available computer, is formed of a CPU, a ROM, a RAM, and an I/F, all of these elements being interconnected through a bus. When the content providing terminal produces a digital content, the terminal transmits the digital content as an electronic mail to the electronic mail server 400 in accordance with previously registered user information, such as a destination address and the date and time of delivery.

The electronic mail server 400, having the same function of a typically available computer, is formed of a CPU, a ROM, a RAM, and an I/F, all of these elements being interconnected through a bus. The electronic mail server 400 relays an electronic mail between each of the content providing terminals $S_1$–$S_n$ and the user terminal 200, and between the content delivery terminal 100 and the user terminal 200. The electronic mail server 400 has a detailed structure that is identical to that a conventional electronic mail server.

The structure of the public information bulletin terminal 300 will now be discussed in detail, referring to FIG. 2 and FIG. 3.

The public information bulletin terminal 300, having the same function of a typically available computer, is formed of a CPU, a ROM, a RAM, and an I/F, all of these elements being interconnected through a bus. The public information bulletin terminal 300 also includes a public information registration data base (the term data base is hereinafter simply referred to as "a DB") 310 registering public information relating to public information issued from government offices and information from grade schools, etc.

Referring to FIG. 2, the public information registration DB 310 stores a government office public information registration table 500 that registers government office public information relating to public information from a government office. FIG. 2 shows a data structure of the government office public information registration table 500.

As shown in FIG. 2, the government office public information registration table 500 can register a single record for each content. Each record is formed of a field 502 that registers a content indicating a summary of the public information from a government office, a field 504 that registers intended persons to whom the content in the field 502 is addressed, a field 506 that registers the date and time on which an event relating to the content in the field 502 takes place, and a field 508 that registers the frequency of advance notices of the content in the field 502.

Referring to FIG. 2, a first row record registers an "INVITATION TO WOMEN'S MEETING" as a content, "WOMEN" as intended persons, "FROM 6 P.M., SECOND FRIDAY, EVERY MONTH" as the data and time, and "ONE WEEK BEFORE, PRECEDING DAY" as the frequency of advance notices.

As seen from FIG. 3, the public information registration DB 310 stores a grade school public information registration table 520 relating to information from a grade school. FIG. 3 shows a data structure of the grade school public information registration table 520.

The grade school public information registration table 520 can register a single record for each content. Each record is composed of a field 522 that registers a content including a summary of an invitation from a grade school, a field 524 that registers intended persons to whom the content in the field 522 is addressed, a field 526 that registers the date and time on which an event relating to the content in the field 522 takes place, and a field 528 that registers the frequency of advance notices of the content in the field 522.

Referring to FIG. 3, the first row record registers an "INVITATION TO THIRTIETH SCHOOLERS' MEETING" as a content, "GRADE SCHOOLERS" as intended persons, "FROM 1:00 P.M., JULY 2 (SUNDAY)" as the date and time, and "ONE WEEK BEFORE, PRECEDING DAY, CURRENT DAY" as the frequency of advance notices.

Figure 4:
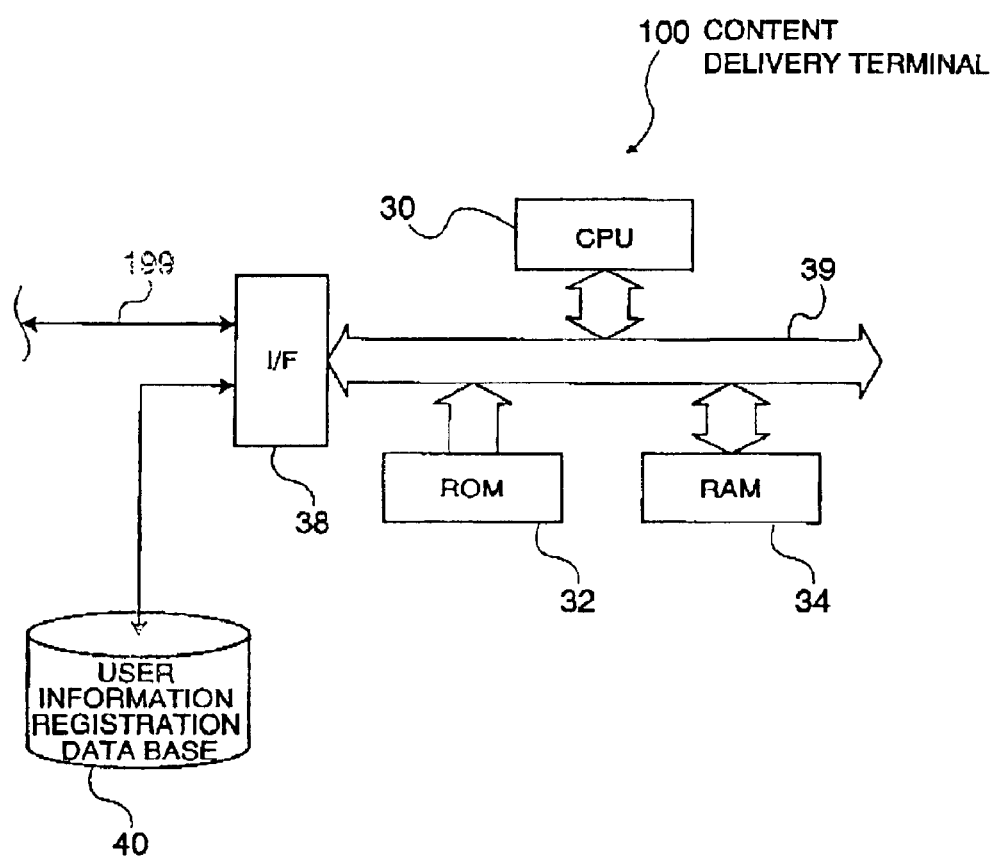
FIG. 4 is a schematic showing the structure of a content delivery terminal 100.
Figure 6:
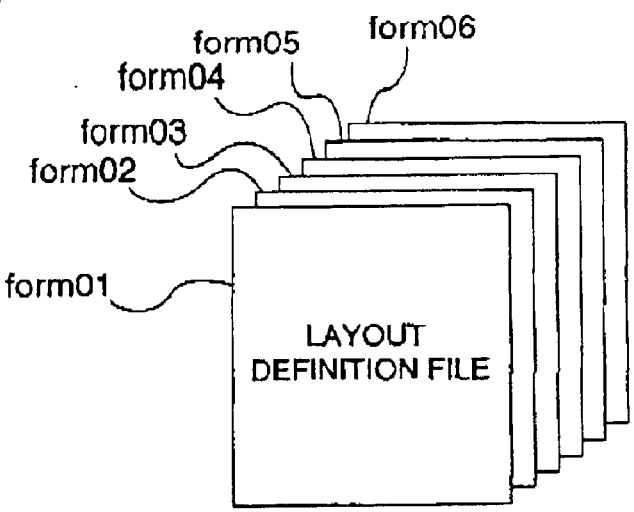
FIGS. 6(a) and 6(b) show data structures of a layout definition file and a layout definition table 630.

Referring to FIG. 4, the structure of the content delivery terminal 100 will now be discussed in detail. FIG. 4 is a schematic showing the structure of the content delivery terminal 100.

As shown in FIG. 4, the content delivery terminal 100 includes a CPU 30 that performs arithmetic operation and controlling the entire system based on a control program, an ROM 32 that stores beforehand the control program of the CPU 30 in a predetermined area thereof, an RAM 34 that stores data read from the ROM 32 or the like and calculation results required in the course of the arithmetic operation of the CPU 30, and an I/F 38 that interfaces with an external device for exchange of data. These components are mutually interconnected through a bus 39, which is a signal line that transfers data.

A user information registration data base 40 that registers user information, and a signal line to connect to the Internet 199 are connected to the I/F 38 as external units.

Referring to FIG. 5, the user information registration DB 40 stores a user profile table 600 in which the user information is registered. FIG. 5 shows a data structure of the user profile table 600.

As shown in FIG. 5, the user profile table 600 can register a single record or a plurality of records for each user. Each record is formed of a field 602 that registers a user ID identifying a user, a field 604 that registers a mail server name of an electronic mail server (the electronic mail server 400 in this case) used by the user, a field 606 that registers a destination address of a digital content, a field 608 that registers a mail password required to access the electronic mail server 400 used by the user, a field 610 that registers the date of delivery, a field 612 that registers the time of delivery, a field 614 that registers a layout number, a field 616 that registers the maximum number of pages, a field 618 that registers a font size, a field 620 that registers an address of the user, a field 622 that registers the age of the user, and a field 624 that registers the family structure of the user.

The field 610 registers the date of delivery on which the user desires a digital content to be delivered. When the delivery of the digital content is desired every day, "EVERY DAY" is designated. When the delivery of the digital content is desired weekdays only, "WEEKDAY" is designated. When the delivery of the digital content is desired weekends, "WEEKEND" is designated. In the example of FIG. 5, the field 610 designates "EVERY DAY," "WEEKDAY," and "WEEKEND," respectively on the first row through the third row thereof.

The field 612 registers the time of delivery at which the user desires the digital content to be delivered on the designated day. As the time of delivery, one day may be divided into 24 hours from zero hour band to twenty-third hour band, and any time band may be designated. Referring to FIG. 5, a fifth hour band, an eleventh hour band, and a ninth hour band are registered in a first row through a third row of the field 612, respectively.

The field 614 registers the layout number that identifies the output layout of the digital content. As the layout number, the layout number identifying the output layout desired by the user is registered, for example. In the example of FIG. 5, layout numbers "2," "5," and "6" are registered in first through third rows of the field 614, respectively. The layout number will be discussed in detail later.

The field 616 registers the maximum number of pages at the upper limit when the digital content is displayed or printed out. As the maximum number of pages, for example, a maximum number of pages or an upper limit may be designated. Alternatively, the letter "u" may be designated to set no upper limit. In the example of FIG. 5, "2" pages, "2" pages, and "u" are respectively registered in first row through third row of the field 616.

The field 618 registers the size of a font that is used when the digital content is displayed or printed out. Referring to FIG. 5, a "SMALL" font, a "SMALL" font and a "STANDARD" font are respectively registered in first row through third row of the field 618.

The field 624 registers, as the family structure of the user, name, age and grade of each member of the family. Referring to FIG. 5, "WIFE (30), OLDEST DAUGHTER (8, SECOND GRADE SCHOOLER)," "WIFE (36), OLDEST SON (15, THIRD GRADE, JUNIOR HIGH SCHOOL)," and "NO FAMILY" are respectively registered in first row through third row of the field 624.

Referring to FIGS. 6(a) and 6(b), the user information registration DB 40 stores a plurality of layout definition files, form01–form06, defining the output layout of the digital contents, and a layout number definition table 630 that indicates the correspondence between the layout definition files, form01–form06, and the layout numbers. FIGS. 6(a) and 6(b) show a data structure of the layout definition file and the layout number definition table 630.

Referring to FIG. 6(a), the layout definition files, form01–form06, each defines a text information box for accommodating text information, the size of a picture contained in the digital content, a layout position in a printing sheet, the size, the type and color of a font of the text information, a character pitch and a line pitch, and the number of, the quality of, and the ratio of pictures. The layout definition files are described in the XML (extensible Markup Language).

Referring to FIG. 6(b), the layout number definition table 630 registers a single record for each layout number. Each record includes a field 632 that registers the layout number, and a field 634 that registers a file name of the layout definition file. In the example of FIG. 6(b), a first record registers "1" as a layout number, and "form01" as a layout definition file name.

The structure of the CPU 30 and the process executed by the CPU 30 will be discussed referring to FIG. 7 and FIG. 8.

Figure 7:
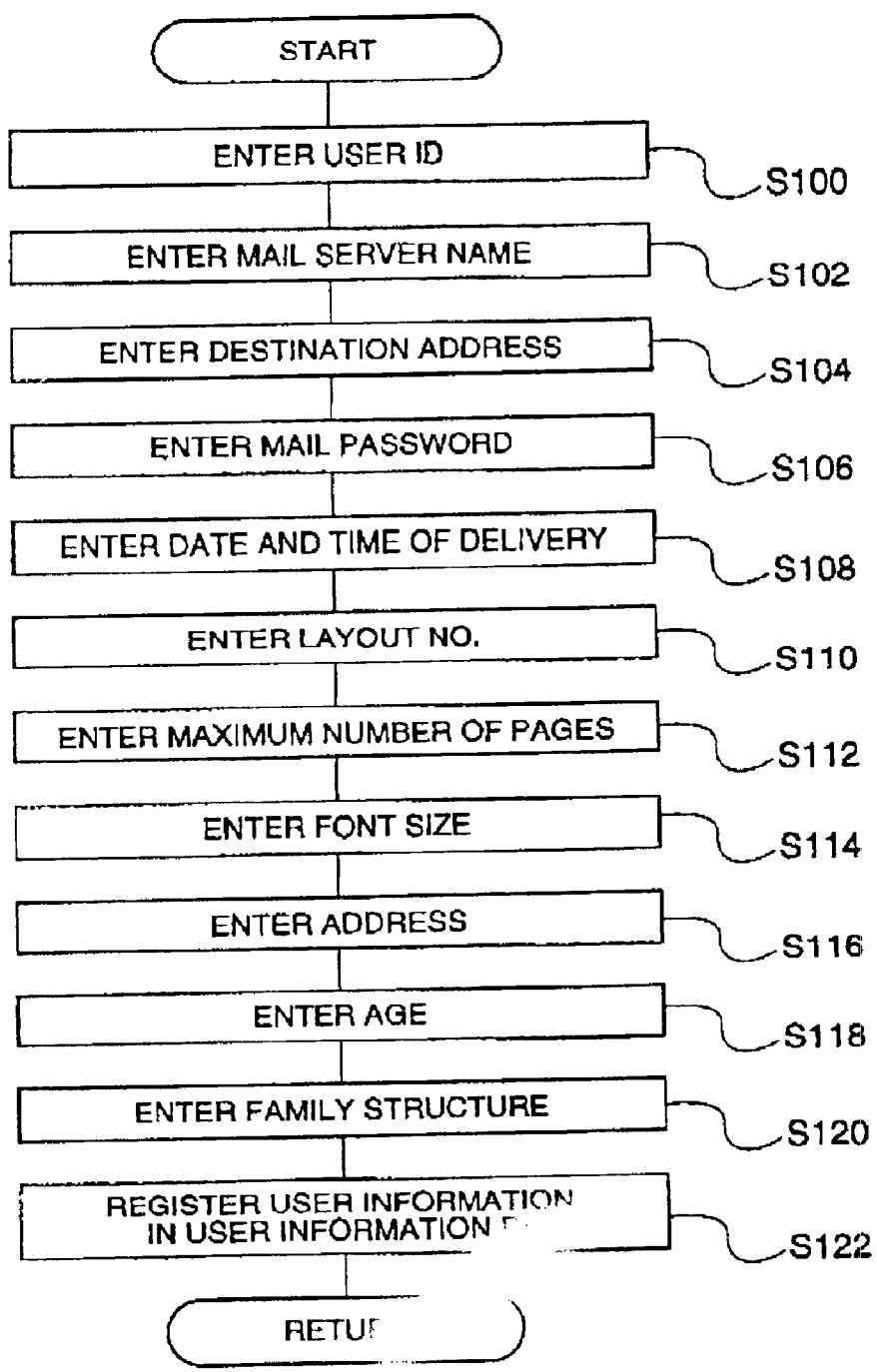
FIG. 7 is a flow diagram showing a user registration process.
Figure 8:
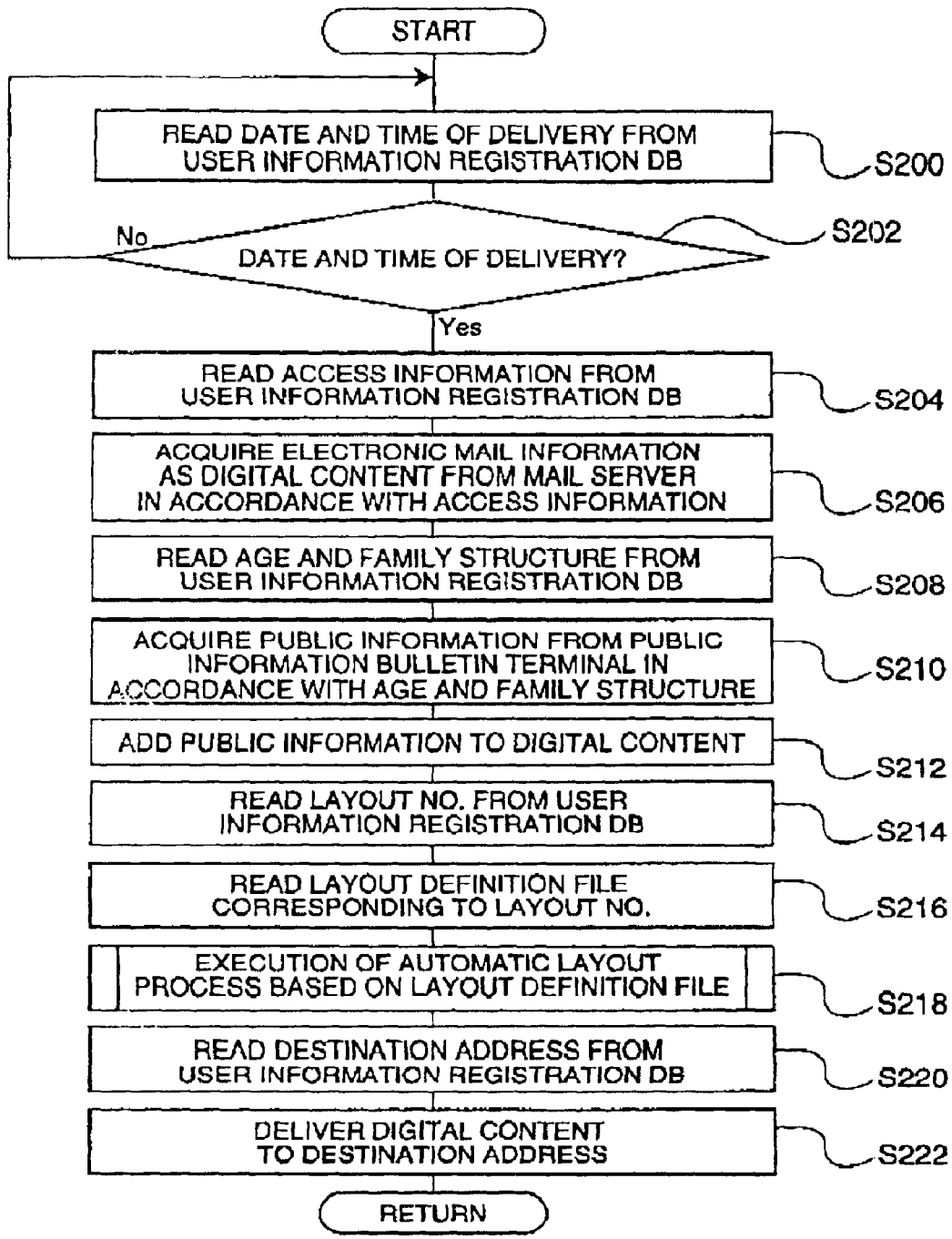
FIG. 8 is a flow diagram showing a content delivery process.

The CPU 30, formed of a micro processing unit (an MPU) and other elements, starts a predetermined program stored in a predetermined area of the ROM 32, and in accordance with the program, executes a user registration process and a content delivery process in a time sharing manner as shown in FIG. 7 and FIG. 8.

The user registration process will first be discussed in detail referring to FIG. 7, which is a flow diagram showing the user registration process.

When the user has accessed the system, the user registration process requests the user to input necessary user information such as the user ID, and registers the input user information in the user profile table 600. When started, the process goes to step S100 as shown in FIG. 7. Input operation in each of the following steps is performed in an interactive manner with users.

In step S100, the user ID is input. In step S102, the mail server name is input. In step S104, the destination address is input, and in step S106, the mail password is input, and the process proceeds to step S108.

In step S108, the date and time of delivery are input. In step S110, the layout number is input. In step S112, the maximum number of pages is input. In step S114, the font size is input. The process proceeds to step S116.

In step S116, the address of the user is input. In step S118, the age of the user is input. In step S120, the family structure of the user is input. In step S122, the user information input in steps S100 through S120 is registered in the user profile table 600, and the process finishes a series of steps to return to the start.

The content delivery process will now be discussed in detail, referring to FIG. 8. FIG. 8 is a flow diagram showing the content delivery process.

The content delivery process is a process to deliver the digital content to the user terminal 200 by referencing the user profile table 600. As shown in FIG. 8, when started in the CPU 30, the process first proceeds to step S200. The process of the following steps is described of one record of the user profile table 600. In practice, each step is performed as many times as the number of records registered in the user profile table 600.

In step S200, the date and time of delivery are read from the user profile table 600. In step S202, the CPU 30 determines, based on the read date and time of delivery, whether it is the day on which the digital content must be delivered. When the CPU 30 determines that it is the day on which the digital content must be delivered (Yes), the process proceeds to step S204, and if not (No), the process returns to step S200.

In step S204, the CPU 30 reads the access information including the mail server name, the destination address, and the mail password (and a mail account (not shown), if necessary) from the user profile table 600. In step S206, the CPU 30 acquires, as a digital content, the electronic mail information of the electronic mail delivered to the user from the electronic mail server 400 in accordance with the read access information. The electronic mail information acquired in step S206 is information contained in the electronic mail delivered to the user from the content providing servers $S_1$–$S_n$, namely, the digital content, such as news. Based on a sender's address and a subject contained in the electronic mail information, for example, the CPU 30 determines whether the electronic mail information is an electronic mail from the content providing servers $S_1$–$S_n$.

In step S208, the CPU 30 reads the age and the family structure of the user from the user profile table 600. In step S210, the CPU 30 acquires public information from the public information bulletin terminal 300 in accordance with the read user's age and family structure. In step S210, the CPU 30 compares the user's age and family structure with those of the intended person of each record in the government office public information registration table 500. When the CPU 30 determines that the user's age and family structure match those of the intended person, the CPU 30 acquires the content and the date and time of the record, and the frequency of advance notices of the record. For example, when wife is included in the user's family structure, the CPU 30 acquires the content of, the date and time of, and the frequency of advance notices of the record having "WOMEN" as the intended person. The CPU 30 compares the user's age and family structure with those of the intended person in the grade school public information registration table 520. When the CPU 30 determines that the user age and family structure match those of the intended person, the CPU 30 acquires the content of, the date and time of, and the frequency of advance notices of the record. For example, when the family structure of the user includes a grade schooler, the CPU 30 acquires the content of, the date and time of, and the frequency of advance notices of the content of the record including "GRADE SCHOOLER" as the intended person.

In step S212, the CPU 30 adds the public information acquired in step S210 to the digital content acquired in step S206. With the public information added, the resulting digital content includes the digital content supplied by the content providing terminal $S_1$–$S_n$, the government office public information or grade school public information, the date and time, and the frequency of advance notices.

In step S214, the CPU 30 reads the layout number from the user profile table 600. In step S216, the CPU 30 references a layout definition table 630, reads the layout definition file corresponding to the read layout number from the user information registration DB 40. In step S218, the CPU 30 performs an automatic layout process in which the output layout of the digital content is determined based on the read layout definition file, and the digital content is laid out. The process proceeds to step S220.

In step S220, the CPU 30 reads a destination address from the user profile table 600. In step S222, the CPU 30 delivers the produced digital content to the read destination address as an electronic mail, and the process then returns to the beginning.

The structure of the user terminal 200 will now be discussed in detail.

Figures 9, 10:
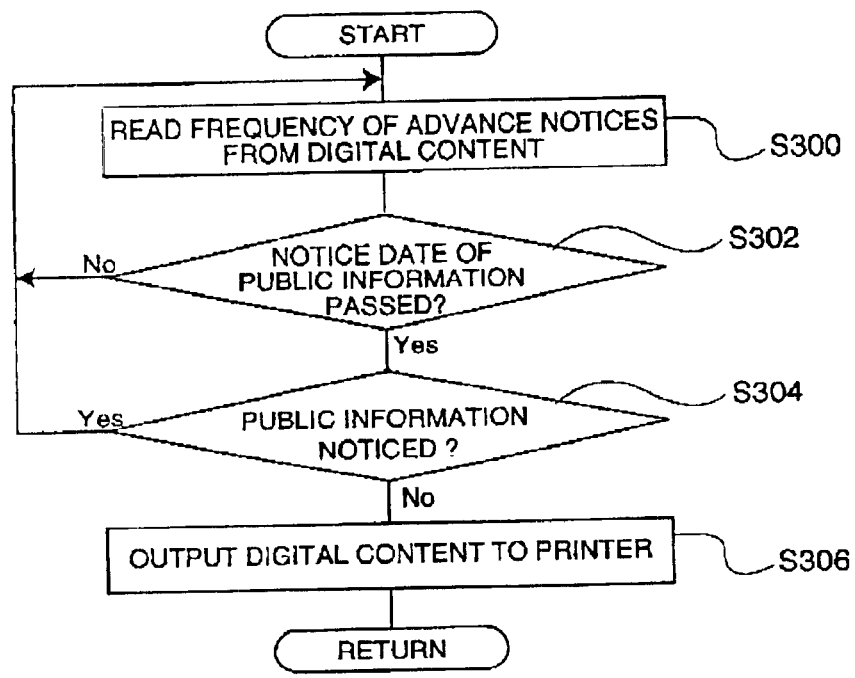
FIG. 9 is a flow diagram showing a digital content printing process.
FIG. 10 shows a log-in information entry screen.

The user terminal 200, having the same function of a typically available computer, is formed of a CPU, a ROM, a RAM, and an I/F, all of these elements being interconnected through a bus. The user terminal 200 is also equipped with a printer 210 and a WWW browser, and can access the content delivery terminal 100 using the WWW browser. A CPU (not shown), including a micro processing unit MPU, etc., is arranged so as to start a predetermined program stored in a predetermined area of a ROM (not shown), and performs a digital content printing process in a flow diagram shown in FIG. 9. FIG. 9 is the flow diagram showing the digital content printing process. The following each step is described on a process of one electronic mail. In practice, the following steps are repeated as many times as the number of electronic mails delivered from the content delivery terminal 100.

The digital content printing process is a process to print the digital content delivered from the content delivery terminal 100. The CPU (not shown) starts the process with step S300 as shown in FIG. 9.

The CPU reads the frequency of advance notices of the digital content in step S300. In step S302, the CPU determines based on the read frequency of advance notices whether the day and the time when the public information of the digital content needs to be informed have passed. When it is determined that the day and the time on which the public information of the digital content needs to be informed have passed (Yes), the process proceeds to step S304.

In step S304, it is determined whether the public information of the digital content has been informed. When it is determined that the public information of the digital content has not yet been informed (No), the process proceeds to step S306. When "PRINTING IS NOT PERFORMED IF PRINTING HAS BEEN ALREADY PERFORMED FIVE TIMES" is set as the frequency of advance notices, it is determined in step S304 whether the number of advance notices has reached five. When "EVERY DAY" is set as the frequency of advance notices, it is determined whether printing has already been performed before the present time on the current day.

In step S306, the digital content is output to a printer 210, and the process returns to the beginning.

On the other hand, when it is determined in step S302 that the day and time when the public information of the digital content needs to be informed have not yet passed (No), or when it is determined in step S304 that the public information of the digital content has already been informed (Yes), the process returns to step S300.

The operation of the above embodiment will now be discussed, referring to FIG. 10 through FIG. 14.

Discussed first is the case in which information required to deliver the digital content from the content delivery terminal 100 is registered.

When the user desires delivery of the digital content, the user accesses the content delivery terminal 100 using the WWW browser on the user terminal 200, and enters a user registration request.

When the user registration request is input, the user terminal 200 receives, through communication with the content delivery terminal 100, screen construction data that forms a log-in information entry screen on which log-in information is input, and a screen as shown in FIG. 10 based on the screen construction data. FIG. 10 shows the log-in information entry screen.

As shown in FIG. 10, the user enters a user ID and a log-in password in respective text boxes 700 and 701 as the log-in information. When the input of the user ID and the log-in password is completed, a button 702 labeled "ENTER" is clicked.

When the entry of the log-in information is completed in the user terminal 200, the log-in information is transmitted to the content delivery terminal 100. In communication with the content delivery terminal 100, the user terminal 200 presents a screen shown in FIG. 11. FIG. 11 shows the delivery information entry screen.

Now, as shown in FIG. 11, the user enters the access information required to access the electronic mail server 400 used by the user and the date and time of delivery desired by the user, as delivery information required to deliver the digital content. A mail server name, a destination address, and a mail password are respectively entered in corresponding text boxes 710 through 712, as the access information. The entry of the delivery date may be performed by pressing any of option buttons 720–723 respectively for "EVERY DAY," "EVERY WEEK," "WEEKDAY (SUNDAY-FRIDAY)," "WEEKEND (SATURDAY AND SUNDAY)." The entry of the time of delivery may be performed by selecting a desired time band in combo boxes 730 and 731 listing time zones. When the entry of the delivery information is completed, a button 732 labeled "ENTER" is clicked.

Figure 12:
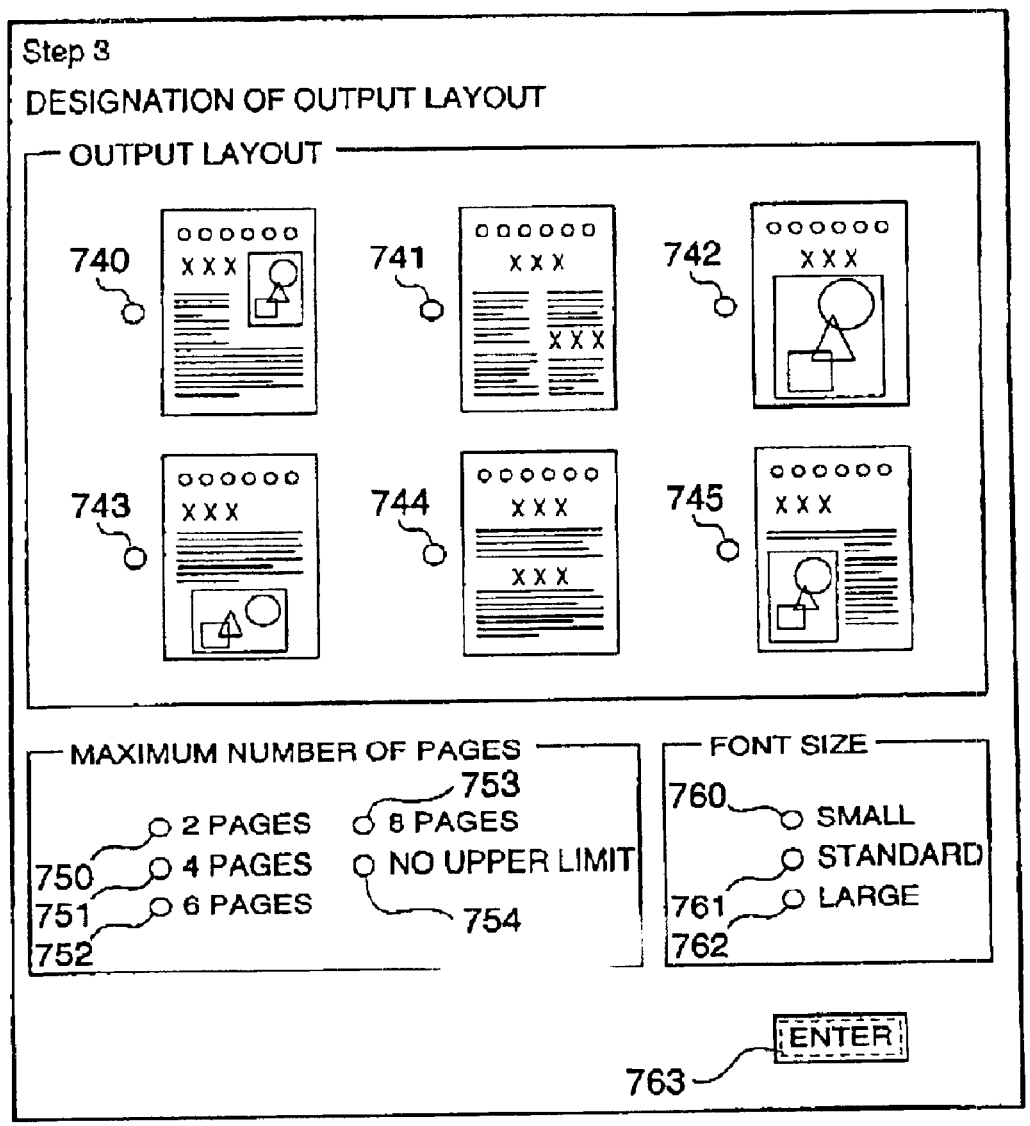
FIG. 12 shows an output layout designation screen.

When the input of the delivery information is completed on the user terminal 200, the delivery information is transmitted to the content delivery terminal 100. Then, in communication with the content delivery terminal 100, the user terminal 200 presents a screen as shown in FIG. 12. FIG. 12 shows a designation screen of output layout and other features.

As shown in FIG. 12, the user designates the layout number, the maximum number of pages, and the font size. The layout number is designated, for example, by selecting one from six option buttons 740–745 corresponding to sample images laid out in accordance with the output layouts. The maximum number of pages is designated, for example, by selecting one of option buttons 750–754 respectively corresponding to the settings of "2 PAGES", "4 PAGES", "6 PAGES", "8 PAGES" and "NO UPPER LIMIT." The font size is designated by selecting one from option buttons 760–762 respectively corresponding to the settings of "SMALL", "STANDARD" and "LARGE." When the designation of these settings is completed, a button 763 labeled "ENTER" is clicked.

When the output layout and others are designated on the user terminal 200, the designation of the output layout and others is transmitted to the content delivery terminal 100. Then, in communication with the content delivery terminal 100, the user terminal 200 presents a screen, as shown in FIG. 13. FIG. 13 shows an address entry screen.

Referring to FIG. 13, the user enters his address, age, and family structure. The user's address may be input, for example, by entering the user's address as a character string in a text box 770. The user's age may be designated, for example, by selecting the user's age from a list of ages registered in a combo box 771.

A family member, sex, age, and grade are designated as the family structure. For example, the designation of the family member is performed by checking any check boxes 772–778 respectively representing "SPOUSE", "BROTHER 1", "BROTHER 2", "BROTHER 3", "CHILD I", "CHILD 2" and "CHILD 3." The designation of the sex of each family member is performed, for example, by selecting a corresponding sex in combo boxes 779–785 where sexuality list is registered. The designation of the age of each family member is performed, for example, by selecting corresponding age in combo boxes 786–792 where age list is registered. The designation of the grade of each member is performed, for example, by selecting corresponding grade in combo boxes 793–798 where grade list is registered. When the entry of the address, etc. is completed, a button 799 labeled "ENTER" is clicked.

Figure 14:
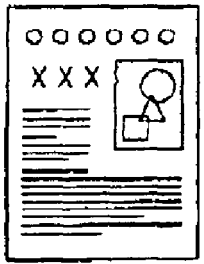
FIG. 14 shows a registration content verification screen.

When the input of the address, etc. is completed on the user terminal 200, the address, the age, and the family structure of the user are transmitted to the content delivery terminal 100. Then, in communication with the content delivery terminal 100, the user terminal 200 presents a screen, as shown in FIG. 14. FIG. 14 shows a registration content verification screen.

Referring to the example in FIG. 14, the user terminal 200 displays "TTT" as the mail server, "aaa@bbb.COM" as the destination address, "Abcdef" as the mail password, and "EVERY DAY, 5:00 A.M." as the date and time of delivery. Also displayed are "XXX" as the address of the user, "32" as the age of the user, "WIFE (30), OLDEST DAUGHTER (8, SECOND GRADE SCHOOLER)" as the family structure. When no error is found, the user clicks a button 800 labeled "START DELIVERY."

When the registered content is verified on the user terminal 200, the delivery start request is sent to the content delivery terminal 100.

When the content delivery terminal 100 receives the delivery start request, the log-in information, the delivery information, the designation of the output layout, the address, etc. are registered in the user profile table 600 in step S122. At the same time, the output layout designation is registered as a layout number referencing the layout definition table 630.

The content delivery terminal 100 performs the content delivery operation referencing the user profile table 600. The content delivery operation will now be discussed.

When the content delivery terminal 100 refers the user profile table 600, and finds that it is the day on which the digital content needs to be delivered, the content delivery terminal 100 reads the access information including the mail server name, the destination address, and the mail password from the user profile table 600 in steps S204–S210. Based on the read access information, the electronic mail information of the electronic mail delivered to the user is acquired from the electronic mail server 400 as the digital content. The user's age and family structure are read from the user profile table 600, and in accordance with the user's age and family structure, the public information is acquired from the public information bulletin terminal 300.

In steps S212–S218, the acquired public information is then added to the digital content, the layout number is read from the user profile table 600, and the layout definition file corresponding to the read layout number is read from the user information registration DB 40. Based on the read layout definition file, the output layout of the digital content is determined and the digital content is then laid out.

Then, in steps S220 and S222, the destination address is read from the user profile table 600, and the produced digital content is delivered to the user terminal 200 of the read destination address.

The user terminal 200 receives the digital content. When it comes to the date and time of notice referencing the frequency of advance notices contained in the digital content, the digital content is output to the printer 210 in steps S304 and S306. The printer 210 prints out the digital content.

For example, the printout may be laid out so that news information is located at the center thereof, while the public information and the date and time are presented on the peripheral area surrounding the news information. When the registered frequency of advance notices is "ONE WEEK BEFORE, PRECEDING DAY, CURRENT DAY," the digital content is printed out by the printer 210 for three times, i.e., on the day of the event notified of by the public information, one week before the day of the event, and the preceding day of the event.

In this embodiment, as described above, the content delivery terminal 100, including the user information registration DB 40, compares the age and family structure of the user in the user information in the user information registration DB 40 with those of the intended person in each record in the government office public information registration table 500, or compares the age and family structure of the user with those of the intended person in the grade school public information registration table 520. When there is a match in each case, the content, the date and time, and the frequency of advance notices of the record are acquired. The public information thus acquired is delivered to the user terminal 200.

Accordingly, the delivered public information includes information that needs more attention from the user at a relatively higher ratio, and a possibility that the information needed by the user escapes the user's attention becomes lower. Since the public information is delivered relatively frequently, the user gains access to relatively new public information that has been just issued. This arrangement prevents the public information important to the user from remaining unnoticed. The user can thus gain relatively new public information with ease.

Further, in this embodiment, the content delivery terminal 100 adds the acquired public information to the digital content, and the resulting digital content is delivered to the user terminal 200.

Since this makes the public information delivered together with the digital content, the user can find the public information, while reading the digital conyent at the same time. The public information is thus visually easy to recognize, and is thus prevented from remaining unnoticed by the user. The user can thus more reliably be prevented from overlooking important public information.

In this embodiment, the user terminal 200 is also arranged to print out the digital content delivered from the content delivery terminal 100 according to the frequency of advance notices corresponding to the digital content.

Since this enables the digital content to be printed out automatically at the date and time of notice set in the frequency of advance notices, the user is much more unlikely to overlook important information as well as events notified by public information. As a result, highly important information among the public information and events notified by public information can be more surely prevented from remaining unnoticed by users.

In addition, the user terminal 200 in this embodiment is arranged to print out the digital content three times, namely, on the day of the event, and one week before and the preceding day of the event or the first day of the event.

In this way, there is less of a possibility that the event notified by the public information will remain unnoticed, and the user is less likely to overlook the event notified by the public information.

The content delivery terminal 100 in this embodiment is arranged to determine the output layout of the digital content based on the user information in the user information registration DB 40 to lay out the digital information.

Since the output layout is thus determined accounting for the user information, the digital content can be output in the output layout that is relatively agreeable with the user's preference. Accordingly, in comparison with the conventional art, the digital content is output in an easy-to-view output layout to the user.

Specifically, as the print layout can be determined and the digital content can be printed out on sheets of paper on a page-by-page basis in this embodiment, it is possible for the user to print out necessary pages only while displaying and viewing the digital content page by page, when the user adopts such a layout that the content on each page is complete as it is. Furthermore, in a layout in which each page is dated, the user may conveniently learn the age of the digital content by the date when the digital content is stored in a file.

The content delivery terminal 100 in this embodiment is arranged to deliver the produced digital content in accordance with the date and time of delivery specified in the layout definition file used in the layout of the digital content.

Since the digital content is delivered within a time band desired by the user, the system provides a delivery service that is highly satisfactory to the user compared to the prior art.

In the above embodiment, the government office public information and the grade school public information correspond to the notice information, or correspond to the public relations information, the information registered in the field 504 and the field 524 correspond to the intended person information, and the information registered in the field 508 and the field 528 correspond to the notice period information. The user information registration DB 40 corresponds to the user information storage device, and the public information registration DB 310 corresponds to the notice information storage device.

Steps S208 and S210 correspond to the notice information selection device or correspond to the mail information acquisition device, step S212 corresponds to the notice information association device, and step S218 corresponds to the content layout device. Steps S220 and S222 correspond to the notice information providing device or correspond to the content delivery device, and step. S306 corresponds to the notice information output device.

In the above embodiment, the user terminal 200 is arranged to print out the digital content three times, namely, on the day of the event, and one week before or the preceding day of the event or of the first day of the event. The present invention is not limited to this arrangement. For example, the digital content may be printed when the user terminal 200 is powered on.

Since the notice is provided when the user terminal 200 is powered on, the user easily learns the notice. This arrangement can thus more surely prevent information important to the user, among the public information, from remaining unnoticed.

In the above embodiment, the user terminal 200 is arranged to print out the digital content three times, namely, on the day of the event, and one week before or the preceding day of the event or of the first day of the event. The present invention is not limited to this arrangement. For example, the user may set, in the user profile table 600, printing time designation information indicating printing time of the public information, and print out the digital content at the time designated by the printing time designation information.

Since the notice is provided in a manner convenient to the user, the ease of use is enhanced to each user. Specifically, in case that one user may be at ease if he will be advised of the day of the event one week before, and another user may prefer to be advised of the event at the day of the event so as not to forget it, such individual requests can be realized according to the present invention.

Although updating of the user information has not been particularly discussed, the user information may be updated at any preferred timing. The user information may be automatically updated, if desired.

In the above embodiment, the public information is acquired according to the address of the user and delivered to the user terminal 200. The present invention is not limited to this arrangement. The user's address may be stored as the user profile, and based on the user's address, a content requiring urgent attention, such as hazard or disaster information in the district of the user or the notice of an evacuation zone may be delivered.

In the above embodiment, the public information is acquired based on the user's address, age, and family structure, and the acquired public information is sent to the user terminal 200. The present invention is not limited to this arrangement. Professional affiliation of the user may be stored as the user profile, and based on it, obituary information of relating sections, or relating companies may be provided to the user.

Security of the access information has not been particularly discussed in the above embodiment, however, the access information may be encrypted and then registered in the user profile table 600. Security of the access information can be thus enhanced.

The user terminal 200 automatically prints out the digital content in the above embodiment. The present invention is not limited to this arrangement. The digital content may be manually printed. In this case, printing starts at the moment the user starts an action, for example, pressing a button on a dedicated application or a browser. The information to be printed may be the one that has been produced beforehand, or may be the one that is produced in steps S204–S218 subsequently to the action of the user.

In another method of automatic printing, a dedicated application sets the date of automatic printing, and when it comes to the set day, printing starts. The information to be printed may be the one that has already been produced, or may be the one that is produced in steps S204–S218 on the set day. Alternatively, the printing may be performed slightly earlier than scheduled, taking into consideration the time required to perform steps S204–S218.

The above embodiment has been discussed on acquisition of public information, however, the present invention may be arranged in such a way that, for example, an expiration date of membership of a video rental shop, or time limit for credit/money transfer may be registered in the user profile table 600. When the membership is going to expire (one week before the expiration date, the preceding day, or the current day), notice information may be issued to the user to notify the user that the membership will soon expire.

The above embodiment is arranged to acquire all the public information relating to the user. However, the present invention is not limited to this arrangement. To reduce the amount of data of the digital content to be delivered, the public information may be selected prior to delivery as follows. First, the public information is selected according to priority specified by the user profile table 600. Second, the public information closer to the date of the event is selected with priority. Third, the public information to be provided for the first time is selected with priority. Fourth, many pieces of pieces of the public information are collected by changing the font and the font size.

A rather simple output layout of digital content is described in the above embodiment, however, in practice, it is preferred that, for example, the font and the size of a display area are changed depending on the frequency of advance notices of the public information, or the font and the display area of the public information are enlarged when the event relating to the public information is going to be held soon, for example, next day or on the current day.

The public information is acquired depending on the user's age and family structure in the above embodiment. The present invention is not limited this arrangement. The notice information may be acquired in accordance with the user's name, age, date of birth, sex and address. When the public information is acquired according to the user's name, personally-related information may be provided to the user. When the public information is acquired according to the age, age-related information, such as information about a regular health check at the age of 30 may be provided. When the public information is acquired according to the date of birth, birthday-related information, such as information regarding a renewal date of a driver's license may be provided. When the public information is acquired according to the address, information unique to the area or district of the address may be provided.

The above embodiment is arranged to acquire the public information according to the user's age and family structure. However, the present invention is not limited to this arrangement and may be arranged to acquire the public information based on the name of a school of the user, or the name of a company that the user is working for. For example, when the user is a high schooler, information regarding high schools may be provided. When the user works for a particular company, information about the company may be provided.

The above embodiment is arranged to acquire the public information based on the user's age and family structure. However, the present invention is not limited to this arrangement. The notice information may be acquired based on the field of the user's interest, the specialty field of the user, the field of information which the user desires to know, or the field of the job of the user. In the case that the notice information is acquired based on the field of the user's interest, or the field of the information which the user desires to know, the user may gain access to information matching the user's interest, for example, to an invitation to a Japanese chess match if he likes Japanese chess playing. In case that the notice information is acquired according to the specialty field or the field of the job of the user, the user may gain access to information about highly specialized fields, such as recruiting information of volunteers who can teach computers.

The above embodiment is arranged to acquire the public information based on the user's age and family structure, however, the present invention is not limited to this arrangement. The user may acquire notice information based on pet information regarding a user's pet. According to the type and age of the pet, the user may gain access to vaccination information.

In the above embodiment, the layout process in step S218 is performed in the content delivery terminal 100, but the present invention is not limited to this arrangement. The layout process may be performed in the user terminal 200. This arrangement prevents the workload from being concentrated on the content delivery terminal 100.

The above embodiment is arranged in such a way that the content delivery terminal 100 acquires the electronic mail information of the electronic mail delivered to the user, as the digital content from the electronic mail server 400, but the present invention is not limited this arrangement. The digital content may be directly acquired from the content providing terminals $S_1$–$S_n$.

In the above embodiment, the content delivery terminal 100 adds the government office public information and the grade school public information to the electronic mail acquired from the electronic mail server 400. The present invention is not limited to this arrangement. For example, information may be acquired from an electronic news server delivering electronic news information or from a schedule server managing a personal schedule, and the government office public information and the grade school public information may be added to the acquired information.

In the above embodiment, the processes shown in the flow diagrams in FIG. 7 and FIG. 8 are performed by executing a control program which stored beforehand in the ROM 32. However, the present invention is not limited to this, and may be arranged in such a way that the processes shown in the flow diagrams in FIG. 7 and FIG. 8 may be executed by reading, from a storage medium, a software program of the process into the RAM 34. The same is true of the flow diagram shown in FIG. 9.

The storage medium herein means a semiconductor storage medium, such as a RAM, a ROM, etc, a magnetic storage medium, such as an FD, an HD, etc, an optical storage medium, such as a CD, a CDV, an LD, a DVD, etc., or a magnetooptical storage medium, such as an MO, etc. The storage medium is thus any computer readable storage medium that permits data to be read electronically, magnetically, or optically.

In the above embodiment, the notice information providing system and the digital content delivery system of the present invention are implemented in a network system such as the Internet 199. The present invention is not limited to this arrangement. Alternatively, the present invention may be applied to what is referred to as an intranet that performs the same communication as that of the Internet 199. The present invention is not limited to a network that performs the same communication method as that of the Internet 199, and may be applied to an ordinary network.

In the notice information providing system and the digital content delivery system of the above embodiment of the present invention, the content delivery terminal 100 delivers digital contents, such as news to the user terminal 200, as shown in FIG. 1. The present invention is not limited to this arrangement, and may be applied to other system configuration without departing from the scope and spirit of the present invention.

As described above, in the notice information providing system of the present invention, the provided notice information contains information important to the user at a relatively high ratio in the notice information provided, and a possibility that the user will overlook highly needed information becomes lower. Since the notice information is relatively frequently provided, the user easily acquires relatively new notice information that may be just issued. In comparison with the conventional art, the user is less likely to overlook the necessary notice information, and can easily gain access to relatively new notice information.

In the notice information providing system of the present invention, the digital content is automatically output at the notice date set by the notice period information so that the user is less likely to overlook information needed by the user himself and less likely to overlook the event notified of by the notice information. Thus, this arrangement has such advantages, such as to prevent the highly needed information in the notice information from remaining unnoticed, and to prevent the event notified by the notice information from escaping the user's attention.

In the notice information providing system of the present invention, the user is less likely to overlook the event notified of by the notice information. The system thus has an advantage of preventing the event notified by the notice information from escaping the user's attention.

In the notice information providing system of the present invention, the notice information is provided when the user terminal is powered on so that the user can easily learn the notice. The system thus prevents the information that is needed by the user in the notice information from escaping the user's attention.

In the notice information providing system of the present invention, the notice is provided in a manner convenient to the user. The ease of use to individual users is thus enhanced.

The notice information providing system of the present invention has such advantages such that the information that is needed by the user can be prevented from remaining unnoticed, and furthermore the user can easily gain access to relatively new information.

In the digital content delivery system of the present invention, the delivered notice information contains information important to the user at a relatively high ratio in the notice information provided, and there is less possibility that the user overlooks information needed by the user himself. Since the notice information is relatively frequently provided, the user can easily acquire relatively new notice information that may be just issued. Since the notice information is delivered together with the digital content, the notice information becomes easy to view. In comparison with the conventional art, the user is thus less likely to overlook the notice information that is needed, and easily gains relatively new notice information.

In the digital content delivery system of the present invention, the output layout accounts for the user information, and the digital content is output in the output layout relatively agreeable with the user's preference. In comparison with the conventional art, the digital content is output in an easy-to-view output layout to the user.

The storage medium storing the notice information providing program of the present invention provides the same advantages as those of the notice information providing system.

What is claimed is:

1. A notice information providing system that provides notice information relating to at least one notice record, wherein each notice record includes an intended person information and a single notice content, to a user using a notice information storage device which stores the notice information intended for users by associating the notice record with intended person information relating to an intended person for whom that notice content is intended, the notice information providing system comprising:

a user information storage device that stores at least one user information relating to the user, the notice record being selected in the notice information storage device, based on the at least one user information in the user information storage device and the intended person information in the notice information storage device, and the selected notice information comprising at least one notice record being provided to the user;

notice information output device that outputs the notice information provided by the notice information providing device, the notice information storage device further storing the notice information by associating the notice information with notice period information relating to a notice period or a notice time limit, the notice information output device outputting the notice information, provided by the notice information providing device, in accordance with the notice period information corresponding to the notice information, and the notice information output device outputting the notice information at the end of the notice period defined by the notice period information or when a remaining duration of time to the notice time limit becomes equal to or shorter than a predetermined time.

2. The notice information providing system according to claim 1, the notice information output device outputting the notice information when a user terminal used by the user is powered on.

3. The notice information providing system according to claim 1, the user information including output time designation information designating the time of outputting the notice information, and the notice information output device outputting the notice information at the time designated by the output time designation information from the user information storage device.

4. The notice information providing system according to claim 1, the notice information storage device further storing the notice information by associating the notice information with notice period information relating to a notice period or notice time limit, and the notice information selection device selecting the notice information based on the notice period information corresponding to the notice information.

5. The notice information providing system according to claim 1, the notice information being public relations information relating to a notice intended for a number of people.

6. A notice information providing system for providing notice information relating to at least one notice record, wherein each notice record includes an intended person information and a single notice content, to a user, comprising:

a user information storage device that stores at least one user information relating to the user;

a notice information storage device that stores the notice information by associating the notice record with intended person information relating to an intended person for whom that notice content is intended;

a notice information selection device that selects the at least one notice record in the notice information storage device, based on the at least one user information in the user information storage device and the intended person information in the notice information storage device; and a notice information providing device that provides the user with the notice information comprising at least one notice record selected by the notice information selection device, the notice information selection device comparing the at least one user information and the intended person information, and selecting the notice information comprising at least one notice record corresponding to the intended person information when the at least one user information in the user information storage device and the intended person information in the notice information storage device satisfy a predetermined condition in the comparison of the at least one user information with the intended person information.

7. A digital content delivery system which delivers a digital content by associating the digital content with notice information relating to at least one notice record, wherein each notice record includes an intended person information and a single notice content, intended for a user, comprising:

a user information storage device that stores at least one user information relating to the user;

a notice information storage device that stores the notice information by associating the at least one notice record with intended person information relating to an intended person for whom that notice content is intended;

a notice information selection device that selects the notice information in the notice information storage device, based on the at least one user information in the user information storage device and the intended person information in the notice information storage device;

a notice information association device that associates the at least one notice record selected by the notice information selection device with the digital content; and a content delivery device that delivers, to the user, the digital content associated with the notice information of the at least one notice record, the notice information selection device comparing the at least one user information and the intended person information, and selecting the at least one notice record corresponding to the intended person information when the at least one user information in the user information storage device and the intended person information in the notice information storage device satisfy a predetermined condition in the comparison of the user information with the intended person information.

8. The digital content delivery system according to claim 7, the notice information storage device storing the notice information by associating the notice information with notice period information relating to a notice period or notice time limit, and the notice information selection device selecting the notice information based on the notice period information corresponding to the notice information.

9. The digital content delivery system according to claim 7, the notice information being public relations information relating to a notice intended for a number of people.

10. The digital content delivery system according to claim 7, further comprising a content layout device that determines an output layout of the digital content with which the notice information is associated in accordance with the user information in the user information storage device, and that lays out the digital content, the content delivery device delivering, to the user, the digital content that is laid out by the content layout device.

11. The digital content delivery system according to claim 7, the digital content being electronic mail information stored in an electronic mail server from which the user receives an electronic mail, the user information containing access information required to acquire the electronic mail information from the electronic mail server, the digital content delivery system including a mail information acquisition device that acquires the electronic mail information from the electronic mail server in accordance with the access information in the user information storage device, and the notice information association device associating the notice information selected by the notice information selection device with the electronic mail information acquired by the mail information acquisition device.

12. A digital content delivery system, comprising:

a user terminal;

a content delivery terminal that delivers a digital content communicably connected to the user terminal used by a user to deliver a digital content with notice information, relating to at least one notice record, wherein each notice record includes an intended person information and a single notice content, to a user, associated with the digital content; and a notice information storage device that stores the notice information by associating the at least one notice record with intended person information relating to an intended person for whom a notice content is intended, or notice period information relating to a notice period or a notice time limit;

the content delivery terminal including a user information storage device that stores the at least one user information relating to the user, a notice information selection device that selects the at least one notice record in the notice information storage device, based on the at least one user information in the user information storage device and the intended person information in the notice information storage device, a notice information association device that associates the at least one notice record selected by the notice information selection device and the notice period information corresponding to the notice record with the digital content, and a content delivery device that delivers, to the user terminal, the digital content associated with the notice information, comprising at least one notice record;

the notice information selection device selecting the at least one notice record corresponding to the intended person information when the at least one user information in the user information storage device and the intended person information in the notice information storage device satisfy a predetermined condition in the comparison of the user information with the intended person information, the user terminal including a notice information output device that outputs the notice information associated with the digital content; and the notice information output device outputting the notice information associated with the digital content in accordance with the notice period information associated with the digital content, and the notice information output device outputting the notice information at the end of the notice period defined by the notice period information or when a remaining duration of time to the notice time limit becomes equal to or shorter than a predetermined time.

13. The digital content delivery system according to claim 12, the notice information output device outputting the notice information when a user terminal used by the user is powered on.

14. The digital content delivery system according to claim 12, the user information including output time designation information designating the time of outputting the notice information, and the notice information output device outputting the notice information at the time designated by the output time designation information from the user information storage device.

15. The digital content delivery system according to claim 12, the content delivery terminal including a receiver device that receives the notice information, and a setting device that sets the notice information received by the receiver means and a user as a destination.

* * * * *